2,923,617
METHOD OF REFINING FERROSILICON MATERIAL

Jörgen A. Kolflaath, Oslo, Norway

No Drawing. Application September 5, 1957
Serial No. 682,090

Claims priority, application Norway May 21, 1955

4 Claims. (Cl. 75—97)

This application is a continuation-in-part of my application Serial No. 585,396, filed May 17, 1956, now abandoned.

By means of experiments the applicant has proved that it is possible to refine commercial ferrosilicon and commercial silicon with solutions containing chloride ions and metal cations which are reduced to a lower, also soluble stage of oxidation, the pH value being less than 5. According to the applicant's invention it is most advantageous to refine with an aqueous solution of trivalent iron at a temperature of approx. 110° C. and at a pH value of approx. zero. Elementary iron and aluminum are then dissolved as respectively divalent iron and trivalent aluminum.

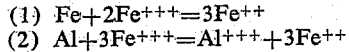

The main effect of hydrochloric acid in the process according to the invention is to prevent the precipitation of iron and aluminum hydroxide.

Experiments described by Examples 2, 3 and 4 set forth hereinafter show that the reaction proceeds considerably faster than the well known refining process with hydrochloric acid without the presence of trivalent iron, described by Example 1 set forth hereinafter.

It is a well known fact that during the leaching process with hydrochloric acid according to Example 1, the velocity of reaction increases with increasing concentration of hydrochloric acid. The most efficient way to refine commercial ferrosilicon and silicon with hydrochloric acid is to start with a commercial 36–38% hydrochloric acid. The amount of acid should be chosen so that the strength of the acid decreases from 36% to 20% during the extraction process. A smaller amount of hydrochloric acid giving an acid strength reduction from 36 to 10% will of course reduce the acid consumption, but the saving of acid costs will not compensate the extra costs due to the slower reaction at the end of the leaching process.

It is a well known fact also that the speed of leaching with hydrochloric acid increases with increasing temperature. If, for example, a refining process starts with commercial concentrated hydrochloric acid, the boiling point of which being 70–80° C., the reaction temperature should not exceed 60° C. to avoid great losses of the reacting agent, hydrochloric acid, due to the formation of hydrogen. The decreasing concentration of hydrochloric acid during the leaching process allows the leaching temperature to be raised from 60° C. in a liquid containing 36% HCl to approx. 100° C. in a liquid containing 24% HCl. On the other hand, due to the exothermic nature of the leaching process, it is very difficult to keep the reaction temperature under control during the leaching process, and thus it is very difficult to avoid losses of hydrochloric acid. 20% hydrochloric acid from a hydrochloric acid leaching process cannot be regenerated in an economical way, and thus it has to be wasted.

A leaching liquid containing 5% HCl and approx. 80 gr. $Fe^{+++}$ per liter boils at a temperature of ca. 115° C. without any mentionable loss of the reacting agent, $Fe^{+++}$. During the leaching process according to the invention the formation of hydrogen is negligible.

Example 4 proves that it is possible to leach, according to the invention at approx. 115° C., with a relatively high speed of reaction compared with the hydrochloric acid leaching process, due not only to the higher reactivity of $Fe^{+++}$ compared with $H^+$, but also due to the higher reaction temperature possible in a leaching process according to the invention.

The extraction liquid from a leaching procedure according to the invention can, in contradiction to the well know hydrochloric acid leaching process, be regenerated in an economical way and used again. Trivalent iron is regenerated from divalent iron by oxidation of the extraction liquid during or after the extraction process, for example, with air, oxygen, nitric acid, chlorates, chlorine or by electrolysis, by methods that are well known from other technical processes. By oxidation of divalent iron with nitric acid, air, chlorates or oxygen or by electrolysis, hydrogen ions are consumed and thus the pH value has to be adjusted by addition of hydrochloric acid, which also increases the concentration of chloride ions.

The oxidation with chlorine does not consume hydrogen ions, but it increases the concentration of chloride ions.

Experiments show that a certain minimum concentration of chloride ions is necessary in order to obtain a useful reaction velocity and that the velocity increases with increasing chloride ion concentration.

The said experiments have proved that a concentration of 1 mol chloride ions per liter still gives a useful reaction velocity. It is therefore very advantageous to extract with a liquid containing other chlorides than iron chloride. In fact, several elements dissolve as chlorides during the extraction process, the extraction liquid thus automatically will contain other chlorides than iron chloride, the concentrations of which will increase during the refining process.

Refined ferrosilicon or silicon is separated from the leaching liquid by decantation or by other separation methods. A certain amount of the extraction liquid adhering to the solid product has to be washed out by water, giving a loss of extraction liquid. On the other hand the concentrations of chloride and trivalent iron ions have increased during the refining process due to the addition of hydrochloric acid, or the oxidation with chlorine. Thus it is very convenient to dilute the extraction liquid continuously or discontinuously with washwater containing chloride ions, in such a way that the amount of extraction liquid and the concentration of chlorides are kept in a state of approximate balance, not exceeding the solubility of the chlorides.

The extraction liquid which is used according to the present invention is far less corroding than hydrochloric acid according to Example 1, and thus less dangerous for the construction materials.

The corroding problems in the neighborhood of plants leaching according to Example 1 arising from the volatility of the hydrochloric acid are avoided in plants leaching according to the invention.

In the following the invention will be explained in greater detail by means of examples, the Example 1 showing the conventional method, the Examples 2–6 showing the method according to the invention.

Example 1

According to the prior art 150 gr. comminuted ferrosilicon material (grain size 8 to 25 mm.) which contained 90% by weight of silicon the rest being aluminum and iron was treated with 300 ml. hydrochloric acid (24%) under continuous agitating at 70° C.

Samples of the extraction liquor were analyzed on aluminum and the degree of extraction was determined as percentage dissolved aluminum, calculated on original aluminum content of the ferrosilicon material.

The samples were taken after 4, 7, 11 and 14 days and the extraction degrees were 40%, 53%, 73%, 86% respectively.

*Example 2*

The process as described in Example 1 was repeated with an extraction liquor that according to the present invention also contained 26 gr. $Fe^{+++}$ per liter, as sulphate.

The extraction degrees obtained after 4, 7, 11 and 14 days: 62%, 79%, 95%, 96% respectively.

*Example 3*

The process as described in Example 1 was repeated with a 2% hydrochloric acid extraction liquid that according to the present invention contained 10 gr. $Fe^{+++}$ per liter, as chloride.

The extraction degrees obtained after 4, 7, 11 and 14 days were 50%, 64%, 84% and 90% respectively.

It has been proved that the concentration of trivalent iron ions in the leaching solution can be as low as 5 gr. per liter with satisfactory leaching rate.

*Example 4*

The process as described in Example 1 was repeated with an extraction liquid that according to the present invention also contained 80 gr. $Fe^{+++}$ per liter. The extraction degrees obtained after 4, 7, 11 and 14 days were 90%, 94%, 96% and 97% respectively.

After 14 days the $Fe^{+++}$ concentration was reduced to about 72 gr. per liter.

*Example 5*

The process as described in Example 4 was repeated at a temperature of 115° C. instead of 70° C.

The extraction degrees obtained after 1, 4, 7 and 11 days were 97%, 98%, 98.5% and 99% respectively.

*Example 6*

8 tons of ferrosilicon material containing 93% Si, 4% Fe, 2% Al, 0.5% Ca and 0.5% other elements were treated in a leaching tank with 12,000 liters of a solution containing 70 gr. $Fe^{+++}$, 10 gr. $Fe^{++}$, 60 gr. $Al^{+++}$, 15 gr. $Ca^{++}$, 5 gr. $Mg^{++}$ and 10 gr. of other cations per liter. The leaching liquid was oxidized with chlorine in a chlorination tank connected to the leaching tank by means of pipe lines through which the leaching liquid was brought to circulate continuously. During the extraction process heat is evolved which maintains the temperature at the boiling point about 115° C. After 24 hours 1.9% Al, 2.4% Fe, 0.5% Ca and 0.2% of other elements are dissolved. The concentration of cations is increased correspondingly during the extraction. Simultaneously the concentration of hydrochloric acid will increase because of the formation of polysilanes and siloxanes from calcium silicide, which will be chlorinated to form silicon chlorides which are decomposed by water delivering HCl to the extraction liquid. The amount of trivalent iron varies between 60 and 80 gr. per liter during the extraction because of the fact that the reduction velocity during the first step of the extraction will be higher than the oxidation velocity.

After 48 hours the liquor is removed from the ferrosilicon material by decantation. 2000 liters of the extraction liquor which still adhere to the ferrosilicon are removed by washing according to the countercurrent method. The first washing step of the ferrosilicon product is conducted with 2000 liters of washing liquid containing chloride ions from the second washing step of the previous charge. The liquid from the first washing step is then mixed with the rest of the extraction liquid, 12,000 liters of extraction liquid again being available for the next ferrosilicon charge. If necessary the pH value is adjusted by addition of hydrochloric acid or by the addition of water. The partly washed ferrosilicon product is then washed in a second step with 2000 liters of pure water which thereafter is stored to be used as washing liquid for the first washing step of the next charge. After the second washing step the ferrosilicon product contains approximately the amounts of salts which have been dissolved during the extraction which salts are washed out by large amounts of water in a third and final washing step.

The net reaction in the process according to Example 6 is a partial chlorination of the contaminations in the ferrosilicon material. The chlorine used in Example 6 amounts to approximately 1000 kg. and it is consumed to a degree of 100%. If the leaching process described were conducted with hydrochloric acid according to the method described by Example 1 the consumption of commercial concentrated hydrochloric acid would amount to approximately 6000 kg.

The chlorination process may also be conducted in the leaching tank without use of a special chlorination tank.

What is claimed is:

1. A method of refining ferrosilicon material comprising subjecting the ferrosilicon material in a comminuted state at a temperature of 50–115° C. to a leaching treatment with a hydrochloric acid solution containing trivalent iron ions, and thereafter washing the ferrosilicon material out with water.

2. A method of refining ferrosilicon material comprising subjecting the ferrosilicon material in a comminuted state at a temperature above atmospheric temperature to a leaching treatment with an acid solution having a pH value of less than 5 and containing chloride ions and trivalent iron ions, and thereafter washing the ferrosilicon material out with water.

3. A method of refining ferrosilicon material comprising subjecting the ferrosilicon material in a comminuted state at a temperature above atmospheric temperature to a leaching treatment with an aqueous solution of hydrochloric acid at a pH value of less than 5, which solution contains trivalent iron ions, and thereafter washing the ferrosilicon material out with water.

4. A method of refining ferrosilicon material comprising subjecting the ferrosilicon material in a comminuted state at a temperature of about 115° C. to a leaching treatment with an aqueous solution of hydrochloric acid at a pH value of less than 5, which solution contains about 70 grams of trivalent iron ions per liter, recycling and conducting the leaching solution through a container containing the ferrosilicon material and through another container wherein the liquor is oxidized by means of chlorine gas, decanting the extraction liquid from the ferrosilicon material, and thereafter washing the ferrosilicon material out with water.

References Cited in the file of this patent

UNITED STATES PATENTS

| | | |
|---|---|---|
| 981,451 | McKechinie | Jan. 10, 1911 |
| 1,943,332 | Mitchell | Jan. 16, 1934 |
| 2,172,969 | Eringer | Sept. 12, 1939 |
| 2,803,521 | Nitzsche | Aug. 20, 1957 |